US009958613B2

United States Patent
Kobayashi et al.

(10) Patent No.: US 9,958,613 B2
(45) Date of Patent: May 1, 2018

(54) LIGHT DIVIDER

(71) Applicant: SEIKO EPSON CORPORATION, Tokyo (JP)

(72) Inventors: Hidekazu Kobayashi, Hara-mura (JP); Hitoshi Ueno, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 14/553,603

(22) Filed: Nov. 25, 2014

(65) Prior Publication Data

US 2015/0146298 A1 May 28, 2015

(30) Foreign Application Priority Data

Nov. 27, 2013 (JP) .................. 2013-244894

(51) Int. Cl.
*G02B 27/10* (2006.01)
*G02B 6/293* (2006.01)
(Continued)

(52) U.S. Cl.
CPC ....... *G02B 6/29367* (2013.01); *G02B 6/0053* (2013.01); *G02B 27/145* (2013.01); *G02B 27/283* (2013.01); *G02B 27/126* (2013.01)

(58) Field of Classification Search
CPC .. G02B 6/0053; G02B 6/0028; G02B 6/0031; G02B 6/0046; G02B 6/0055; G02B 6/002; G02B 6/4215; G02B 27/0172; G02B 5/045; G02B 6/0016; G02B 6/0018; G02B 6/00; G02B 6/0051; G02B 27/0905; G02B 27/283; G02B 27/145; G02B 27/126
(Continued)

(56) References Cited

U.S. PATENT DOCUMENTS 5,076,664 A 12/1991 Migozzi
6,075,632 A * 6/2000 Braun ............... G01J 3/36
359/634
(Continued)

FOREIGN PATENT DOCUMENTS

JP     A-11-5186     1/1999
JP     B2-2888602     5/1999
(Continued)

*Primary Examiner* — Ricky Mack
*Assistant Examiner* — Daniele Manikeu
(74) *Attorney, Agent, or Firm* — Oliff PLC (57) ABSTRACT

A light divider includes a light guide having first and second surfaces that reflect light incident on the guide and cause the light to propagate through a portion between the first and second surfaces. A first light dividing layer on the second surface reflects part of the light having propagated through the guide and transmits part thereof so that the light is divided into light fluxes. A first transparent piece on the second surface in a position where the light that the first light dividing layer has transmitted is incident, the first transparent piece having a first reflection surface that reflects the incident light, a second transparent piece that is provided on the second surface in a position where the light reflected off the first light dividing layer and reflected off the first surface is incident, the second transparent piece has a second reflection surface that reflects the incident light.

16 Claims, 6 Drawing Sheets (51) Int. Cl.
*G02B 27/14* (2006.01)
*F21V 8/00* (2006.01)
*G02B 27/28* (2006.01)
*G02B 27/12* (2006.01)

(58) Field of Classification Search
USPC ....... 359/576, 595, 622, 459, 629, 633, 634, 359/636, 639, 861, 619, 618; 362/615, 362/610, 620, 606, 97.1, 97.2, 607, 608, 362/613, 619, 626, 259, 339, 511, 623, 362/625, 235, 560, 576, 595, 622, 459, 362/629, 633, 634, 636, 639, 861
See application file for complete search history.

(56) References Cited

U.S. PATENT DOCUMENTS

| | | | |
|---|---|---|---|
| 6,285,423 B1 | 9/2001 | Li et al. | |
| 6,742,907 B2 | 6/2004 | Funamoto et al. | |
| 6,981,792 B2* | 1/2006 | Nagakubo | G02B 6/0036 |
| | | | 362/23.15 |
| 8,068,285 B1* | 11/2011 | Flynn | G02B 13/00 |
| | | | 359/619 |
| 2002/0131180 A1* | 9/2002 | Goodman | G02B 6/29367 |
| | | | 359/634 |
| 2008/0304282 A1 | 12/2008 | Mi et al. | |
| 2010/0202048 A1* | 8/2010 | Amitai | G02B 27/2235 |
| | | | 359/485.02 |
| 2010/0315833 A1 | 12/2010 | Holman et al. | |
| 2012/0163024 A1* | 6/2012 | Edamitsu | F21V 5/02 |
| | | | 362/611 |
| 2012/0294037 A1 | 11/2012 | Holman et al. | |
| 2013/0107572 A1 | 5/2013 | Holman et al. | |
| 2013/0141937 A1* | 6/2013 | Katsuta | G02B 6/005 |
| | | | 362/606 |
| 2013/0170028 A1* | 7/2013 | Arakawa | G03B 21/60 |
| | | | 359/449 |
| 2014/0268873 A1 | 9/2014 | Holman et al. | |
| 2015/0036386 A1 | 2/2015 | Holman et al. | |
| 2015/0168635 A1 | 6/2015 | Holman et al. | |
| 2015/0168636 A1 | 6/2015 | Holman et al. | |

FOREIGN PATENT DOCUMENTS

| | | |
|---|---|---|
| JP | 2001-156371 A | 6/2001 |
| JP | 2003-215318 A | 7/2003 |
| JP | A-2006-23568 | 1/2006 |
| JP | A-2007-311365 | 11/2007 |
| JP | 2009-087921 A | 4/2009 |
| JP | A-2009-248173 | 10/2009 |
| JP | 2011-512006 A | 4/2011 |
| WO | 2012/057792 A1 | 5/2012 |

* cited by examiner

LIGHT DIVIDER

This application claims the benefit of Japanese Patent Application No. 2013-244894, filed on Nov. 27, 2013. The content of the aforementioned application is incorporated herein by reference in its entirety.

BACKGROUND

1. Technical Field

The present invention relates to a light divider.

2. Related Art

There is a variety of known technologies for dividing a single light flux into a plurality of light fluxes. JP-A-2009-248173 discloses a technology in which laser light is allowed to be incident on an acoustooptic device and the acoustooptic device divides the laser light based on a diffraction phenomenon. In this process, the angle of diffraction is modulated by an acoustic wave signal. JP-A-11-5186 discloses a technology in which no light guide but half-silvered mirrors are used to divide laser light into a plurality of light fluxes. Japanese Patent No. 2,888,602 discloses a technology in which a plurality of half-silvered mirrors disposed in a light guide divide light.

The technology described in JP-A-2009-248173 is problematic in that the incident light cannot be divided into a plurality of light fluxes parallel to each other. The technology described in JP-A-11-5186 has problems of difficulty in optical axis alignment, high susceptibility to dust, poor mobility, and others. The technology described in Japanese Patent No. 2,888,602 is problematic in that the interval between divided light fluxes or the light exiting angle cannot be designed independently of each other and the manufacturing cost is high.

SUMMARY

An advantage of some aspects of the invention is to provide a technology for dividing incident light into a plurality of light fluxes parallel to each other in a simpler configuration.

An aspect of the invention provides a light divider including a light guide having a first surface and a second surface that reflect light incident on the light guide and causing the light to propagate through a portion between the first surface and the second surface, a first light dividing layer that is provided on the second surface and divides the light having propagated through the light guide into reflected light and transmitted light, a first member that reflects the light that the first light dividing layer has transmitted, and a second member that reflects the light that the first light dividing layer has reflected, and the light reflected off the first member exits through the first surface.

The light divider, which has a configuration formed of the light guide, the first member, the second member, and the first light dividing layer, can divide incident light into a plurality of light fluxes.

The light divider may further include a light incident surface on which the light is incident, the light incident surface may be inclined to a normal to the first surface by an angle $\theta$, and the angle $\theta$ may be equal to a propagation angle of the light that propagates through the light guide.

The light divider with this configuration, which uses no light incident member, can externally guide incident light into the light guide.

The angle $\theta$, a thickness $t$ of the light guide, and an interval $d$ between the first member and the second member may satisfy the following expression.

$$\tan\theta = \frac{t}{d/2}$$

According to the light divider with this configuration, the angle of the incident light, the thickness of the light guide, or the interval between the first member and the second member can be designed at a desired value.

An angle $\theta_1$ of the first member with respect to the second surface, an exiting angle $\theta_2$ of the light reflected off the first member, and a propagation angle $\theta$ of the light that propagates through the light guide may satisfy the following expression.

$$\theta_1 = 45 - \frac{\theta + \theta_2}{2}$$

(angle is in degrees)

According to the light divider with this configuration, the angle $\theta_1$, the exiting angle $\theta_2$, or the propagation angle $\theta$ can be designed at a desired value.

The light divider described above may further include a second light dividing layer that is provided on the second surface and divides the light having propagated through the light guide into reflected light and transmitted light, and optical reflectance of the second light dividing layer may be lower than optical reflectance of the first light dividing layer.

The light divider with this configuration can provide exiting light fluxes having more uniform intensities.

The light divider described above may further include n members including the first member and the second member and (n−1) light dividing layers including the first light dividing layer and the second light dividing layer, and among the (n−1) light dividing layers, reflectance of an i-th light dividing layer counted from the side where the light is incident may be expressed by the following expression.

$$r = \frac{n-i}{n-i+1}$$

The light divider with this configuration can provide exiting light fluxes having more uniform intensities.

The light divider described above may further include n members including the first member and the second member, and the n members may be disposed on the second surface along two directions.

The light divider with this configuration can divide incident light two-dimensionally.

Another aspect of the invention provides a light divider including a one-dimensional light divider that one dimensionally divides light incident thereon and outputs a plurality of light fluxes and a second light divider that two-dimensionally divides the plurality of light fluxes outputted from the one-dimensional light divider. The one-dimensional light divider includes a first light guide having a first surface and a second surface that reflect light incident on the first light guide and causing the light to propagate through a portion between the first surface and the second surface, a first light dividing layer that is provided on the second surface and divides the light having propagated through the first light guide into reflected light and transmitted light, a first member that reflects the light that the first light dividing layer has transmitted, and a second member that reflects the light that the first light dividing layer has reflected, and the light reflected off the first member exits through the first surface. The two-dimensional light divider includes a second light guide having a third surface and a fourth surface that reflect light incident on the second light guide and causing the light to propagate through a portion between the third surface and the fourth surface, a second light dividing layer that is provided on the fourth surface and divides the light having propagated through the second light guide into reflected light and transmitted light, a third member that reflects the light that the second light dividing layer has transmitted, and a fourth member that reflects the light that the second light dividing layer has reflected, and the light reflected off the third member exits through the third surface.

The light divider with this configuration can divide incident light two-dimensionally.

The first light guide and the second light guide may be bonded to each other, and a reflection layer that reflects the light may be provided at the interface between the first light guide and the second light guide.

According to the light divider with this configuration, each of the light fluxes divided in the first light guide can be further divided in the second light guide into light fluxes.

The light divider may further include a reflection surface that reflects the light outputted from the two-dimensional light divider.

According to the light divider with this configuration, when a piece to be irradiated is placed between the two-dimensional light divider and the reflection surface, the optical path length in the piece under irradiation can be doubled.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
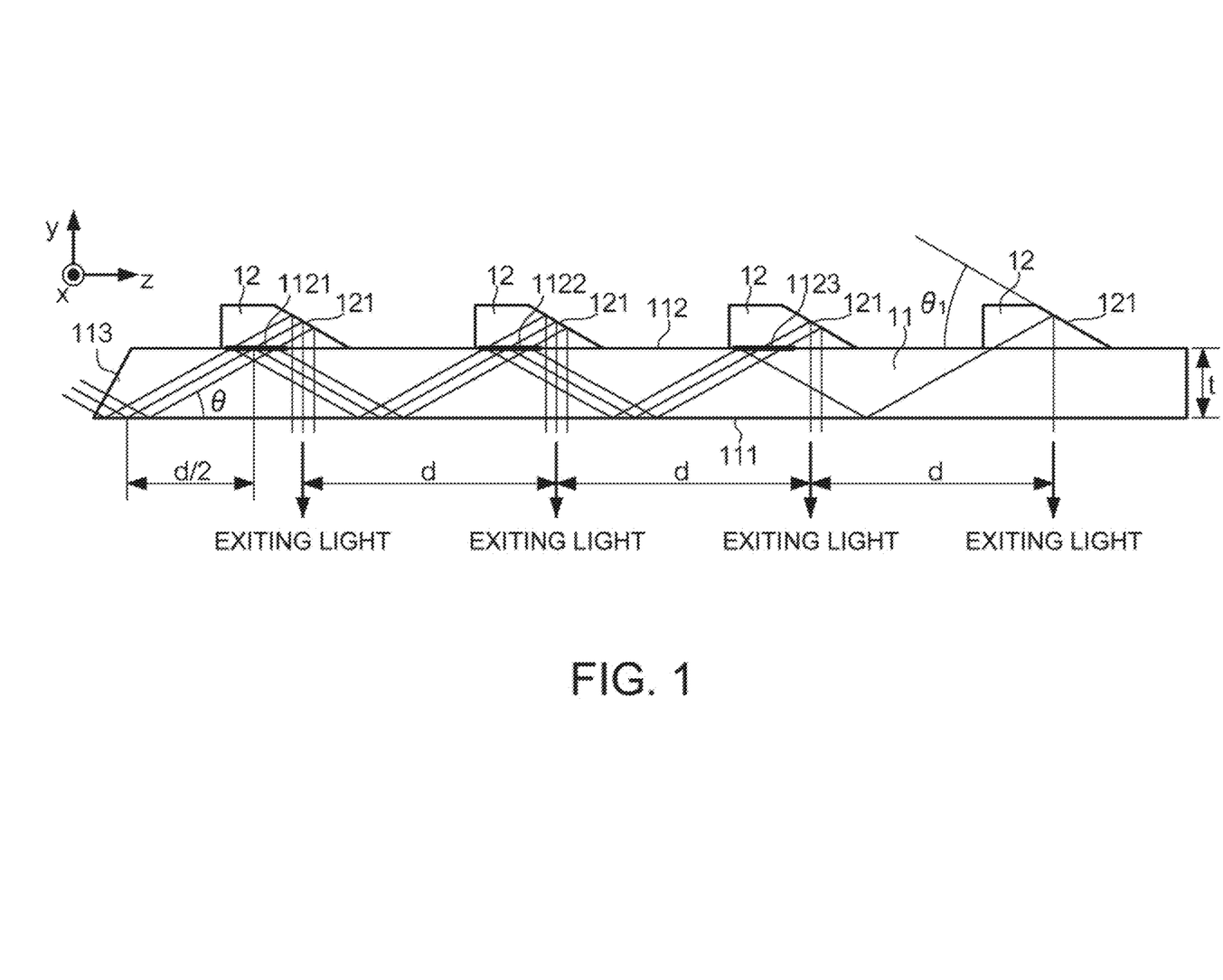
FIG. 1 shows the configuration of a light divider according to a first embodiment.

FIG. 1 shows the configuration of a light divider 1 according to a first embodiment of the invention. The light divider 1 is an apparatus that divides light incident thereon into n (a plurality of) light fluxes. In the example shown in FIG. 1, incident light is divided into four light fluxes (n=4). In this example, the positions where the divided light fluxes exit out of the light divider are located along a straight line. That is, the light divider 1 is a one-dimensional light divider. FIG. 1 is a diagrammatic cross-sectional view taken along a plane parallel to the direction in which the incident light propagates and the direction in which the divided light fluxes exit out of the light divider.

The light divider 1 includes a light guide 11 and n transparent pieces 12.

The light guide 11 is a structural body that allows light to propagate and is made of a light transmissive material, for example, quartz glass. The light guide 11 has a plate-like shape and has a surface 111 and a surface 112. The surface 111 and the surface 112 are parallel to each other and are upper and lower surfaces of the light guide 11 in the example shown in FIG. 1. Light having entered the light guide 11 propagates through the light guide 11 (propagates from left to right in the example shown in FIG. 1) while alternately reflected off the surface 111 and the surface 112. It is defined in FIG. 1 that the light propagation direction is called a z axis and the direction of a normal to the surfaces 111 and 112 is called a y axis.

The light guide 11 further has a light incident surface (surface 113) on which light is incident. In this example, the surface 113 is inclined to a normal to the surfaces 111 and 112 by an angle $\theta$. The angle $\theta$ is equal to the angle of incidence of the incident light (light propagation angle in light guide 11).

The surface 112 has (n−1) semi-reflection layers provided thereon. Each of the semi-reflection layers is a layer that reflects part of light incident thereon and transmits part thereof, that is, a layer that divides the incident light into reflected light and transmitted light (light dividing layer). In the example shown in FIG. 1, in which n=4, three semi-reflection layers (semi-reflection layers 1121 to 1123) are provided. Each of the semi-reflection layers is formed, for example, of a diffraction grating, a metal thin film, or a dielectric thin film. The (n−1) semi-reflection layers are disposed at fixed intervals. Specifically, the angle of incidence $\theta$ of the light incident on the light guide 11, the thickness t of the light guide 11, and the interval d between the semi-reflection layers satisfy the following Expression (1).

$$\tan \theta = \frac{t}{d/2} \qquad (1)$$

The interval d between the semi-reflection layers corresponds to the interval d between exiting light fluxes (divided light fluxes). To achieve a desired interval d between exiting light fluxes for a given angle of incidence $\theta$, the thickness t of the light guide 11 only needs to be designed in accordance with Expression (1). Instead, for a given interval d between exiting light fluxes and a given thickness t of the light guide 11, the angle of incidence $\theta$ only needs to be designed in accordance with Expression (1).

It is noted that the transmittance of each of the semi-reflection layers is not necessarily equal to the reflectance thereof. In this example, among the n semi-reflection layers, the reflectance r of an i-th semi-reflection layer counted from the light incident side is expressed by the following Expression (2).

$$r = \frac{n-i}{n-i+1} \qquad (2)$$

Specifically, the reflectance r1 of the semi-reflection layer 1121 is r1=¾=75% (transmittance of 25%). The reflectance r2 of the semi-reflection layer 1122 is r2=⅔=67% (transmittance of 33%). The reflectance r3 of the semi-reflection layer 1123 is r3=½=50% (transmittance of 50%). No semi-reflection layer is provided in a position set apart from the semi-reflection layer 1123 by the distance d in the light traveling direction. It is assumed in the description that each of the semi-reflection layers is an ideal semi-reflection layer that produces no optical loss.

Each of the n transparent pieces 12 is an element (member) that changes the optical path of the light having passed through the corresponding semi-reflection layer. Each of the transparent pieces 12 is a prism in this example. The transparent pieces 12 are provided along the optical path of the light propagating through the light guide 11 in positions corresponding to the semi-reflection layer. Since the light having passed through the semi-reflection layers propagates through the respective transparent pieces 12, the transparent pieces 12 are preferably made of the same material as that of the light guide 11. When the transparent pieces 12 and the light guide 11 are made of materials different from each other, the difference in the refractive index between them is preferably small.

Each of the transparent pieces 12 has a reflection surface 121, which is inclined to the surface 112 by an angle $\theta_1$. The light having passed through each of the semi-reflection layers is reflected off the corresponding reflection surface 121, propagates through the light guide 11, and exits through the surface 111. The angle of the exiting light (exiting angle) with respect to a normal to the surfaces 111 and 112 is $\theta_2$. Since $\theta_2 = 0°$ (exiting light is perpendicular to surface 111) in the example shown in FIG. 1, $\theta_2$ is not shown. The angle $\theta_1$, the exiting angle $\theta_2$, and the light propagation angle $\theta$ in the light guide 11 satisfy the following Expression (3), in which the angle is in degrees (°).

$$\theta_1 = 45 - \frac{\theta + \theta_2}{2} \quad (3)$$

To achieve a desired exiting angle $\theta_2$ for a given angle of incidence $\theta$, the angle $\theta_1$ of the reflection surface 121 of each of the transparent pieces 12 only needs to be designed in accordance with Expression (3). The angle $\theta_1$ of the reflection surface 121 of each of the transparent pieces 12 may instead be designed separately from those for the other transparent pieces 12. That is, the exiting angle $\theta_2$ of each exiting light flux is allowed to differ from those of the other exiting light fluxes.

As a specific example, consider now a case where a light guide having a thickness of 7 mm is used to provide exiting light fluxes that exit out of the light guide at an exiting angle of 90° through portions set apart at intervals of 25 mm. Based on Expression (1), $\theta$=29.24880 is obtained. Further, based on Expression (3), $\theta_1$=30.37560 is obtained. In accordance with these parameters, the light guide 11 and the transparent pieces 12 may be designed.

The function of the light divider 1 will be described. In the description, an i-th transparent piece 12 counted from the light incident side is called a transparent piece 12(i), and the reflection surface 121 of the transparent piece 12(i) is called a reflection surface 121(i). Light incident at the angle of incidence $\theta$ propagates toward the positive side of the z axis direction in FIG. 1 while repeatedly reflected off the surfaces 111 and 112. The proportion of incident light reflected off the semi-reflection layer 1121 is 75% (the term "incident light" used herein refers to light externally incident on the light guide 11). The semi-reflection layer 1121 transmits the remaining 25% of the incident light, and the transmitted light enters the transparent piece 12(1). The light having entered the transparent piece 12(1) is reflected off the reflection surface 121(1), passes through the light guide 11, and exits through the surface 111.

The light reflected off the semi-reflection layer 1121 is reflected off the surface 111 and reaches the semi-reflection layer 1122. The semi-reflection layer 1122 reflects part of the light having propagated thereto (75% of the incident light at this point), specifically, reflects 66% thereof (50% of the incident light). The semi-reflection layer 1122 transmits the remaining 33% of the light having propagated thereto (25% of the incident light), and the transmitted light enters the transparent piece 12(2). The light having entered the transparent piece 12(2) is reflected off the reflection surface 121(2), passes through the light guide 11, and exits through the surface 111.

The light reflected off the semi-reflection layer 1122 is reflected off the surface 111 and reaches the semi-reflection layer 1123. The semi-reflection layer 1123 reflects part of the light having propagated thereto (50% of the incident light at this point), specifically, reflects 50% thereof (25% of the incident light). The semi-reflection layer 1123 transmits the remaining 50% of the light having propagated thereto (25% of the incident light), and the transmitted light enters the transparent piece 12(3). The light having entered the transparent piece 12(3) is reflected off the reflection surface 121(3), passes through the light guide 11, and exits through the surface 111.

The light reflected off the semi-reflection layer 1123 is reflected off the surface 111 and reaches the surface 112. Since no semi-reflection layer is provided but only the transparent piece 12(4) is provided in this position, the light having reached the surface 112 (25% of the incident light at this point) is not reflected off the interface between the light guide 11 and the transparent piece 12 but entirely enters the transparent piece 12(4). The light having entered the transparent piece 12(4) is reflected off the reflection surface 121(4), passes through the light guide 11, and exits through the surface 111.

As described above, the light divider 1 can extract n light fluxes each having an intensity 1/n (25% in this example) of the incident light and set apart at the equal intervals d. The light divider 1, which has a simple configuration formed of the light guide, the semi-reflection layers, and the reflection surfaces (prisms), allows precise, efficient light division. According to one exemplary aspect, when viewing FIG. 1, the semi-reflection layer 1121, the semi-reflection layer 1122, the leftmost transparent piece 12, and the left-center transparent piece 12 can be considered a first light dividing layer, a second light dividing layer, a first member and a second member, respectively. Of course, other pieces of structure discussed above can be considered a first light dividing layer, a second light dividing layer, a first member and a second member.

2. Second Embodiment

Figure 2:
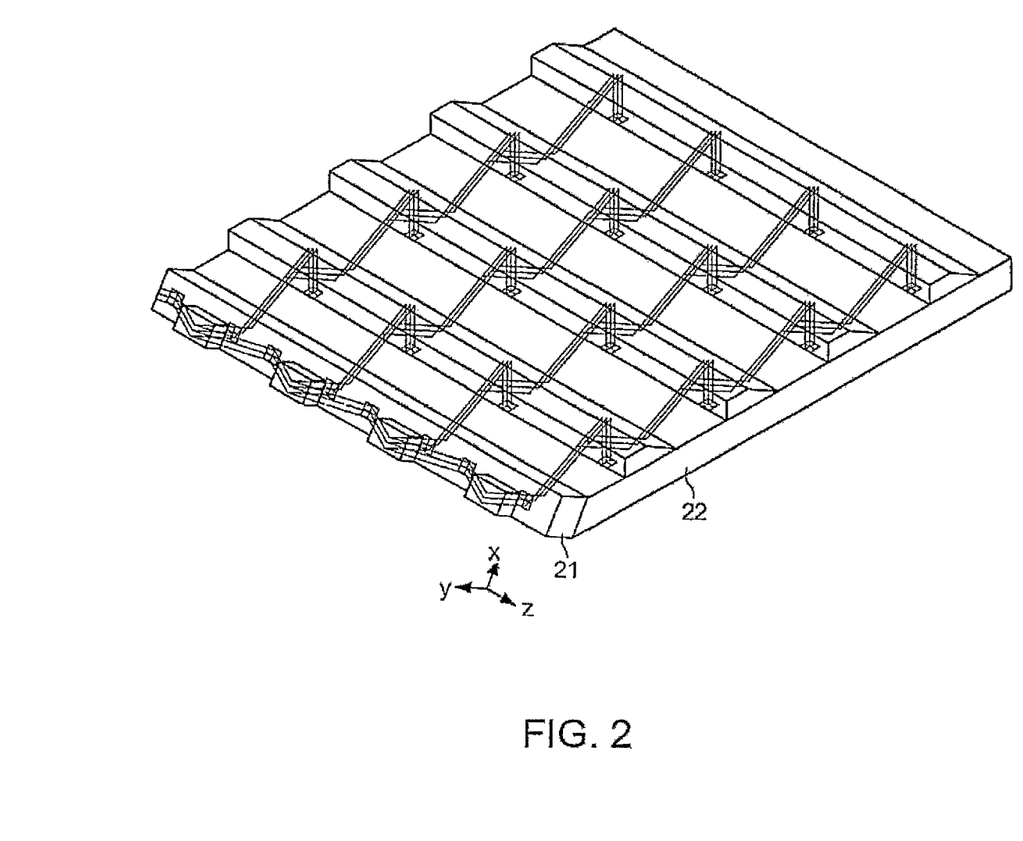
FIG. 2 shows the configuration of a light divider according to a second embodiment.

FIG. 2 shows the configuration of a light divider 2 according to a second embodiment. FIG. 2 is a schematic view of the light divider 2 viewed obliquely upward with respect to exiting light fluxes. The light divider 1 is a one-dimensional light divider, whereas the light divider 2 is a two-dimensional light divider. That is, the positions where divided light fluxes exit out of the light divider are located along at least two directions. In this example, the light exiting positions are arranged in an m×n matrix. That is, the light divider 2 divides incident light into (m×n) light fluxes (m=n=4 in the example shown in FIG. 2).

The light divider 2 has a light dividing element 21 and a light dividing element 22. The light dividing element 21 is a one-dimensional light dividing element and divides incident light into n light fluxes. The light dividing element 22 further divides each of the n light fluxes outputted from the light dividing element 21 into m light fluxes. In FIG. 2, three axes are defined as follows: The light propagation direction in the light dividing element 21 is called a z axis; the direction of a normal to the reflection surfaces of the light dividing element 21 is called a y axis; and the direction perpendicular to both the z and y axes is called an x axis.

Figure 3:
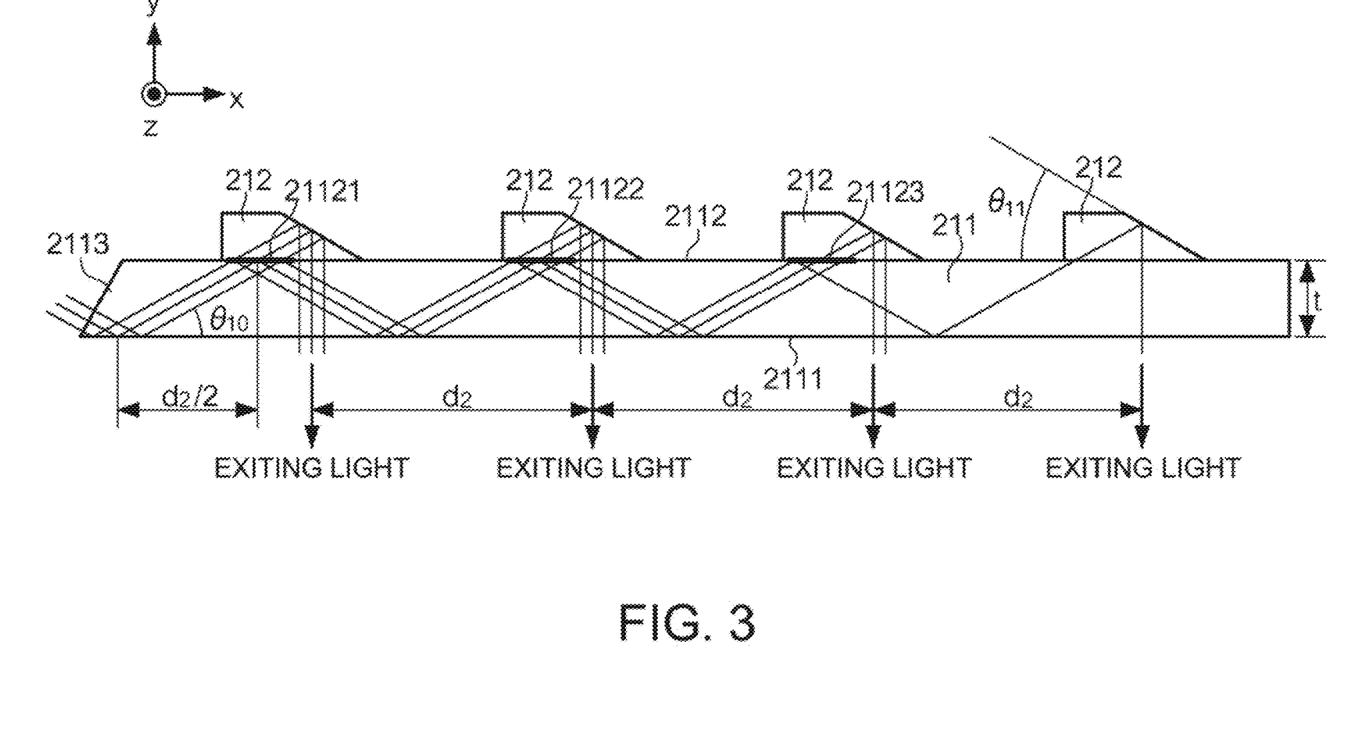
FIG. 3 shows the configuration of a light dividing element.

FIG. 3 shows the configuration of the light dividing element 21. FIG. 3 is a diagrammatic cross-sectional view taken along a plane parallel to the direction in which the incident light propagates and the direction in which the divided light fluxes exit out of the light dividing element. The light dividing element 21 has the same configuration as that of the light divider 1.

The light dividing element 21 has a light guide 211 and n transparent pieces 212. The light guide 211 and the transparent pieces 212 are the same as the light guide 11 and the transparent pieces 12. The light guide 211 has a plate-like shape and has a surface 2111 and a surface 2112. The surface 2111 and the surface 2112 are parallel to each other and are upper and lower surfaces of the light guide 211 in the example shown in FIG. 3. Light having entered the light guide 211 propagates through the light guide 211 while alternately reflected off the surface 2111 and the surface 2112. The light guide 211 further has a light incident surface (surface 2113) on which light is incident. In this example, the surface 2113 is inclined to a normal to the surfaces 2111 and 2112 by an angle $\theta$. The angle $\theta$ is equal to the angle of incidence of the incident light (light propagation angle $\theta10$ in light guide 211).

The surface 2112 has (n−1) semi-reflection layers provided thereon. In the example shown in FIG. 3, in which n=4, three semi-reflection layers (semi-reflection layers 21121 to 21123) are provided. Each of the semi-reflection layers is formed, for example, of a diffraction grating, a metal thin film, or a dielectric thin film. The (n−1) semi-reflection layers are disposed at fixed intervals d2.

Each of the transparent pieces 212 has a reflection surface that is inclined to the surface 2112 by an angle $\theta11$. The light having passed through each of the semi-reflection layers is reflected off the corresponding reflection surface, propagates through the light guide 211, and exits through the surface 2111. The angle of the exiting light (exiting angle) with respect to a normal to the surfaces 2111 and 2112 is $\theta12$. Since $\theta12=0°$ (exiting light is perpendicular to surface 2111) in the example shown in FIG. 3, $\theta12$ is not shown.

Figure 4:
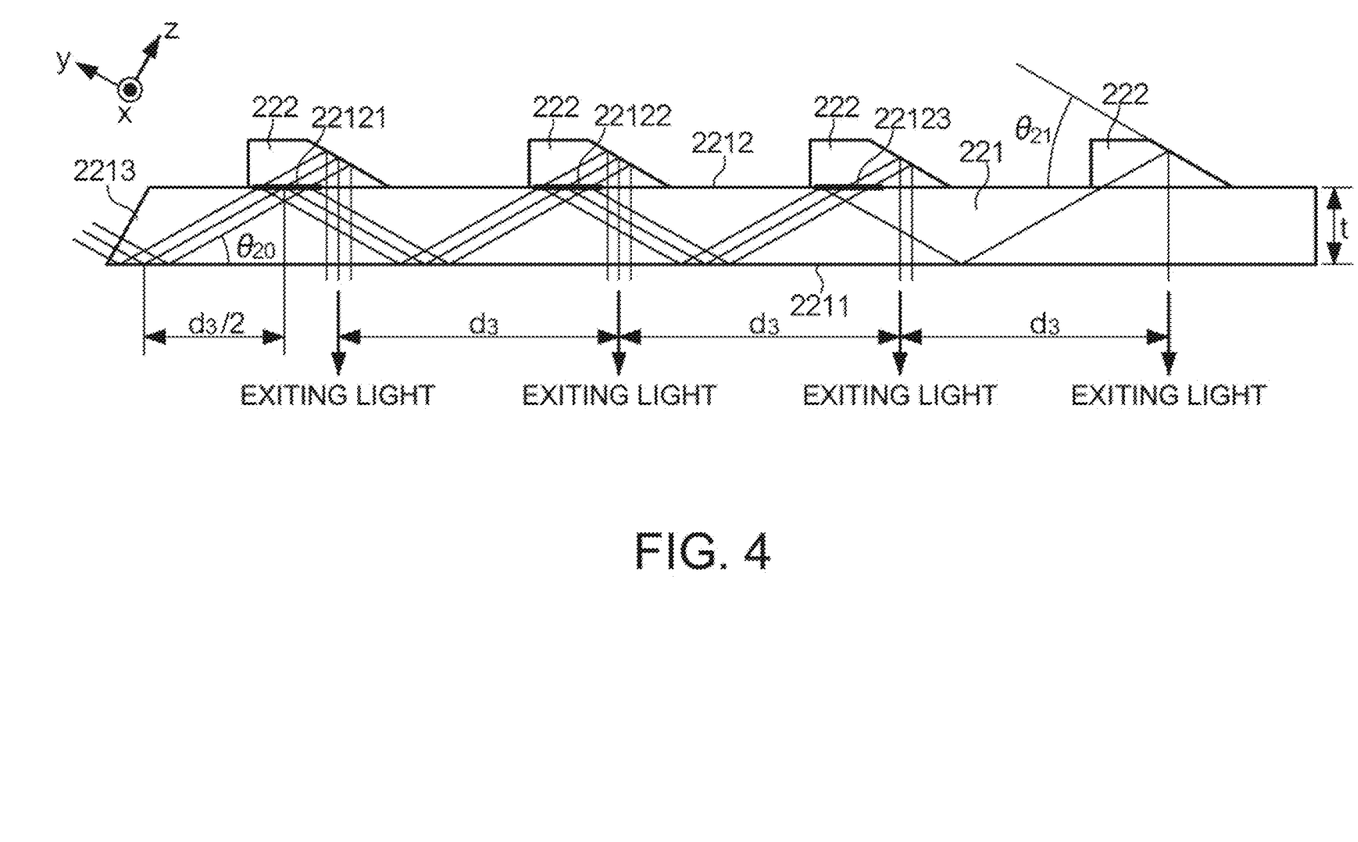
FIG. 4 describes the structure of another light dividing element.

FIG. 4 describes the structure of the light dividing element 22. FIG. 4 is a diagrammatic cross-sectional view taken along a plane parallel to the direction in which the incident light propagates and the direction in which the divided light fluxes exit out of the light dividing element. The light dividing element 22 has a light guide 221 and m transparent pieces 222. The light guide 221 and the transparent pieces 222 are the same as the light guide 11 and the transparent pieces 12. The light guide 221 and the transparent pieces 222 are preferably made of the same materials as those of the light guide 211 and the transparent pieces 212.

The light guide 221 has a plate-like shape and has a surface 2211 and a surface 2212. The surface 2211 and the surface 2212 are parallel to each other and are upper and lower surfaces of the light guide 221 in the example shown in FIG. 4. Light having entered the light guide 221 propagates through the light guide 221 while alternately reflected off the surface 2211 and the surface 2212. The light guide 221 further has a light incident surface (surface 2213) on which the light fluxes outputted from the light dividing element 21 are incident. In this example, the surface 2213 is bonded to the surface 2111 of the light dividing element 21 (that is, light guide 211 and light guide 221 are bonded to each other). When the light guide 211 and the light guide 221 are optically bonded to each other, the surface 2111 does not totally reflect light (light does not propagate through light guide 211). A reflection layer is therefore formed in an area where light should be totally reflected. The reflection layer is formed, for example, of an air layer (in this case, a recess is provided in the surface 2111 of the light guide 211), a metal thin film, or a dielectric thin film.

In this example, the surface 2213 is inclined to a normal to the surfaces 2211 and 2212 by an angle $\theta20$. The angle $\theta20$ is equal to the angle of incidence of the incident light (light propagation angle in light guide 221).

The surface 2212 has (m−1) semi-reflection layers provided thereon. In the example shown in FIG. 4, in which m=4, three semi-reflection layers (semi-reflection layers 22121 to 22123) are provided. Each of the semi-reflection layers is formed, for example, of a diffraction grating, a metal thin film, or a dielectric thin film. The (m−1) semi-reflection layers are disposed at fixed intervals d3. The interval d3 may or may not be equal to the interval d2 between the exiting light fluxes that exit out of the light dividing element 21.

Each of the transparent pieces 222 has a reflection surface inclined to the surface 2212 by an angle $\theta21$. The light having passed through each of the semi-reflection layers is reflected off the corresponding reflection surface, propagates through the light guide 221, and exits through the surface 2211. The angle of the exiting light (exiting angle) with respect to a normal to the surfaces 2211 and 2212 is $\theta22$. Since $\theta22=0°$ (exiting light is perpendicular to surface 2211) in the example shown in FIG. 4, $\theta22$ is not shown. The thus configured light dividing element 22 allows (n×m) light fluxes to exit out thereof.

FIGS. 5A to 5D illustrate results of simulated intensities of exiting light fluxes. In the simulation, LightTools manufactured by Synopsys, Inc. was used. Input light was assumed to be laser light having a diameter of 2 mm, and a case where the light divider 2 shown in FIG. 2 divides the input light into 4×4 light fluxes was simulated. Each of the semi-reflection layers was assumed to be an ideal semi-reflection layer having no optical absorption (loss). Specifically, it was assumed that the semi-reflection layer 22121 had a reflectance of 75%, the semi-reflection layer 22122 had a reflectance of 67%, and the semi-reflection layer 22123 had a reflectance of 50%.

Figure 5A:
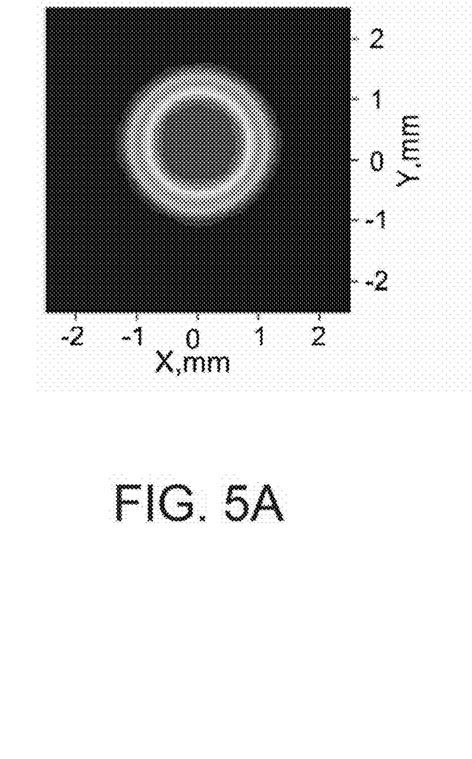
FIGS. 5A to 5D illustrate results of simulated intensities of exiting light fluxes.
Figure 5B:
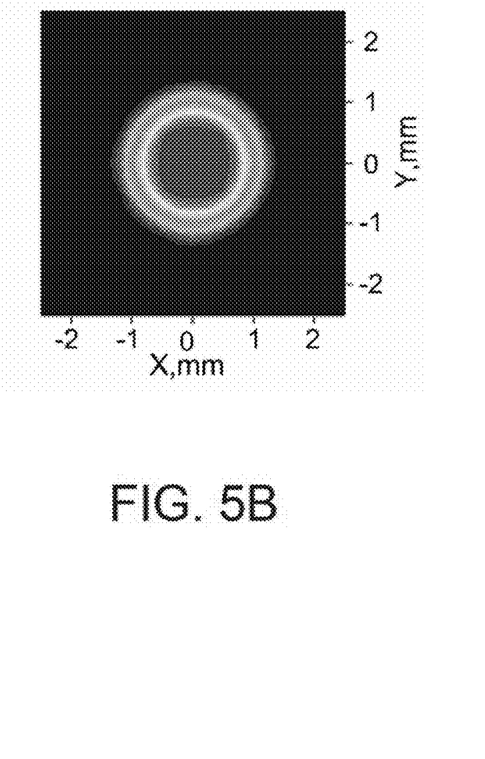
Figure 5C:
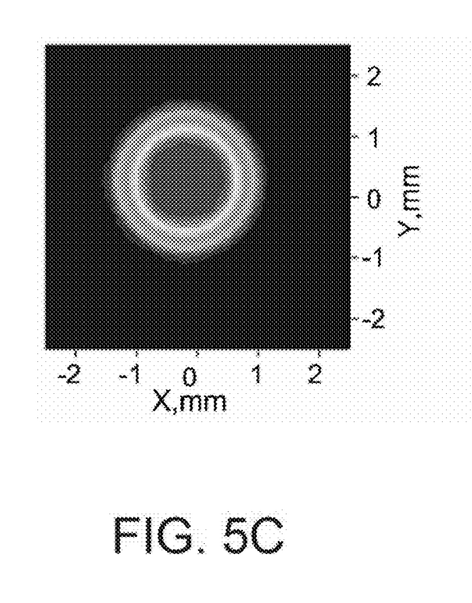
Figure 5D:
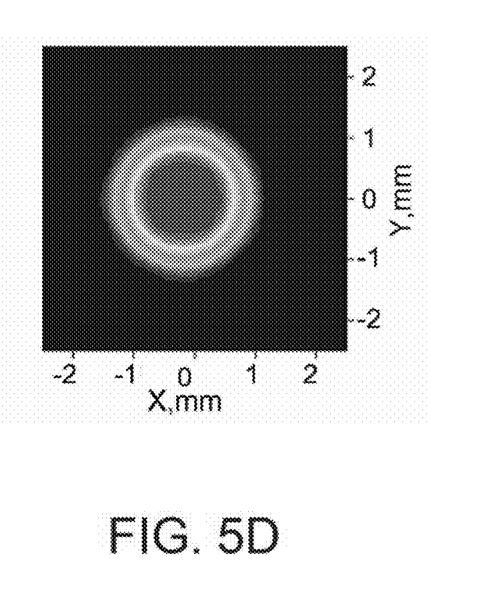

FIGS. 5A to 5D show the intensities of some of the exiting light fluxes in the 4×4 matrix, specifically, exiting light fluxes at the four corners of the matrix. Specifically, FIG. 5A shows the intensity of an exiting light flux at the upper left corner, FIG. 5B shows the intensity of an exiting light flux at the upper right corner, FIG. 5C shows the intensity of an exiting light flux at the lower left corner, and FIG. 5D shows the intensity of an exiting light flux at the lower right corner. FIGS. 5A to 5D show that exiting light fluxes having the same intensity are provided.

In the example shown in FIG. 2, each of the transparent pieces 222 is an elongated piece extending along the corresponding row of light exiting positions. The transparent pieces may instead be discrete pieces provided in all the light exiting positions. That is, the light dividing element 22 may have (n×m) transparent pieces. To incline the exiting light fluxes with respect to the z axis, the transparent pieces 222 only need to be rotated around the y axis.

3. Third Embodiment

Figure 6:
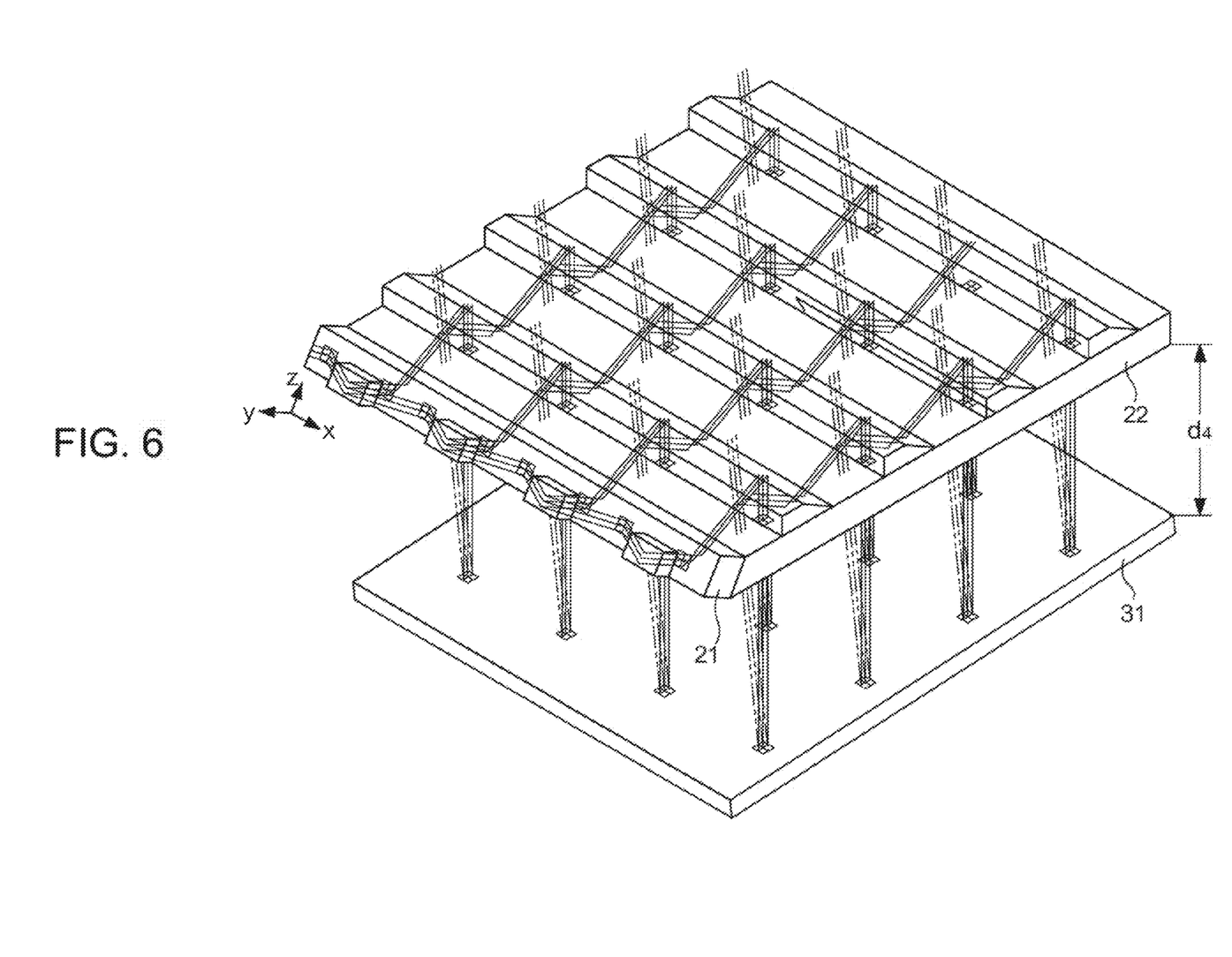
FIG. 6 shows the configuration of a light divider according to a third embodiment.

FIG. 6 shows the configuration of a light divider 3 according to a third embodiment. The light divider 3 includes a reflection layer 31 in addition to the light divider 2 (two-dimensional light divider) described in the second embodiment. The surface 2211 of the light divider 2 and the reflection layer 31 are parallel to each other and disposed with a spacing d4 therebetween. An arbitrary piece to be irradiated can be disposed in the space between the surface 2211 and the reflection layer 31. The piece to be irradiated is an object that is affected by irradiation light or a device that operates in response to irradiation light. The piece to be irradiated is, for example, a sensor that senses a physical state in response to irradiation light. The light divider 3, as compared with the light divider 2, can double the optical path length in the piece under irradiation.

4. Variations

The invention is not limited to the embodiments described above, and a variety of variations are conceivable. Some variations will be described below. Among the following variations, two or more may be combined with each other.

The shape of the light guide is not limited to a flat plate having surfaces parallel to each other. The light guide does not necessarily have a plate-like shape as long as the light guide has two surfaces parallel to each other.

Any of the light dividers according to the embodiments of the invention can, for example, be used with an apparatus that optically pumps an atom, a light source for a 3D scanner, a laser machining apparatus, and a digital signage.

What is claimed is:

1. A light divider comprising:
   a light guide having a first surface and a second surface that reflect light incident on the light guide and causing the light to propagate through a portion between the first surface and the second surface;
   a first light dividing layer that is provided on the second surface and divides the light having propagated through the light guide into reflected light and transmitted light;
   a first member that reflects the light that the first light dividing layer has transmitted; and
   a second member that reflects the light that the first light dividing layer has reflected,
   wherein the light reflected off the first member exits through the first surface.

2. The light divider according to claim 1,
   further comprising a light incident surface on which the light is incident,
   wherein the light incident surface is inclined to a normal to the first surface by an angle θ, and
   the angle θ is equal to a propagation angle of the light that propagates through the light guide.

3. The light divider according to claim 1,
   wherein the angle θ, a thickness t of the light guide, and an interval d between the first member and the second member satisfy the following expression:

$$\tan\theta = \frac{t}{d/2}.$$

4. The light divider according to claim 1,
   wherein an angle θ1 of the first member with respect to the second surface, an exiting angle θ2 of the light reflected off the first member, and a propagation angle θ of the light that propagates through the light guide satisfy the following expression:

$$\theta_1 = 45 - \frac{\theta + \theta_2}{2}$$

(angle is in degrees).

5. The light divider according to claim 1,
   further comprising a second light dividing layer that is provided on the second surface and divides the light having propagated through the light guide into reflected light and transmitted light,
   wherein optical reflectance of the second light dividing layer is lower than optical reflectance of the first light dividing layer.

6. The light divider according to claim 5, further comprising:
   n members including the first member and the second member; and
   (n−1) light dividing layers including the first light dividing layer and the second light dividing layer,
   wherein among the (n−1) light dividing layers, reflectance of an i-th light dividing layer counted from the side where the light is incident is expressed by the following expression:

$$r = \frac{n-i}{n-i+1}.$$

7. The light divider according to claim 1, further comprising
   n members including the first member and the second member,
   wherein the n members are disposed on the second surface along two directions.

8. A light divider comprising:
   a one-dimensional light divider that one dimensionally divides light incident thereon and outputs a plurality of light fluxes; and
   a two-dimensional light divider that two-dimensionally divides the plurality of light fluxes outputted from the one-dimensional light divider,
   wherein the one-dimensional light divider includes
   a first light guide having a first surface and a second surface that reflect light incident on the first light guide and causing the light to propagate through a portion between the first surface and the second surface,
   a first light dividing layer that is provided on the second surface and divides the light having propagated through the first light guide into reflected light and transmitted light,
   a first member that reflects the light that the first light dividing layer has transmitted, and a second member that reflects the light that the first light dividing layer has reflected, the light reflected off the first member exits through the first surface, the two-dimensional light divider includes a second light guide having a third surface and a fourth surface that reflect light incident on the second light guide and causing the light to propagate through a portion between the third surface and the fourth surface, a second light dividing layer that is provided on the fourth surface and divides the light having propagated through the second light guide into reflected light and transmitted light, a third member that reflects the light that the second light dividing layer has transmitted, and a fourth member that reflects the light that the second light dividing layer has reflected, and the light reflected off the third member exits through the third surface.

9. The light divider according to claim 8, wherein the first light guide and the second light guide are bonded to each other, and a reflection layer that reflects the light is provided at the interface between the first light guide and the second light guide.

10. The light divider according to claim 8, further comprising a reflection surface that reflects the light outputted from the two-dimensional light divider.

11. The light divider according to claim 1, wherein the second member is provided on the second surface of the light guide.

12. The light divider according to claim 8, wherein the second member is provided on the second surface of the first light guide.

13. The light divider according to claim 1, wherein the first member is provided on the second surface of the light guide.

14. The light divider according to claim 8, wherein the first member is provided on the second surface of the first light guide.

15. The light divider according to claim 1, wherein the first member and the second member are both outside of the light guide.

16. The light divider according to claim 8, wherein the first member and the second member are both outside of the first light guide.

* * * * *